United States Patent [19]

Helt et al.

[11] Patent Number: 4,850,198
[45] Date of Patent: Jul. 25, 1989

[54] TIME BASED COOLING BELOW SET POINT TEMPERATURE

[75] Inventors: Robert W. Helt, Tyler, Tex.; John D. Neal, Forest City, Iowa

[73] Assignee: American Standard Inc., New York, N.Y.

[21] Appl. No.: 297,920

[22] Filed: Jan. 17, 1989

[51] Int. Cl.⁴ .......................................... G05D 23/32
[52] U.S. Cl. ........................................ 62/93; 62/157; 62/231
[58] Field of Search .............. 236/46 R; 62/157, 231, 62/173, 93; 165/12

[56] References Cited

U.S. PATENT DOCUMENTS

| 2,130,093 | 9/1938 | Kettering | 62/4 |
| 2,301,725 | 11/1942 | Wile | 62/6 |
| 4,388,692 | 6/1983 | Jones et al. | 364/557 |

FOREIGN PATENT DOCUMENTS

| 636723 | 2/1962 | Canada |  |
| 0033578 | 3/1980 | Japan | 62/231 |
| 0217038 | 9/1987 | Japan | 62/231 |

Primary Examiner—William E. Wayner
Attorney, Agent, or Firm—William J. Beres; David L. Polsley; Robert J. Harter

[57] ABSTRACT

A method of controlling a refrigeration compressor involves momentarily energizing the compressor after extended off periods. When the temperature of a comfort zone remains below its set point temperature for an extended period, such as at night, periodically energizing the compressor for brief periods improves the confort level of the zone.

14 Claims, 3 Drawing Sheets

TIME BASED COOLING BELOW SET POINT TEMPERATURE

TECHNICAL FIELD

The invention generally pertains to thermostats and more specifically to an electronic thermostat that periodically commands a refrigeration cooling system to operate even though the temperature of the zone being cooled by the system is below the set point temperature.

BACKGROUND OF THE INVENTION

Cooling systems are generally activated when the temperature of a room or zone being cooled by the system is above a desired set point temperature, and deactivated when below. Under low load conditions, such as at night when the outdoor temperature drops, the frequency and length of time the system is activated greatly decreases. If the system is left deactivated for an extended period, a lack of both dehumidification and air circulation may make the room air feel uncomfortable, even though the room temperature is at or near the set point.

For greater comfort, some systems include a humidistat and are responsive to both cooling and dehumidification demands. Humidistats, however, have several drawbacks. They are not always reliable, they increase the cost of the control, and they are often unresponsive to ventilation needs.

Other systems place a small resistive heating element near the thermostat's temperature sensor. The heating element is energized when the cooling system is off. The thermostat reacts to the heat by energizing the cooling system more frequently than if the heating element were not used. The heating element, however, also adds unnecessary cost to the control and often involves trial and error manual adjustments.

SUMMARY OF THE INVENTION

To overcome the problems of existing controls for cooling systems, it is a primary object of the invention to employ a microcomputer based timer to periodically activate a cooling system for predetermined on periods between predetermined off-periods, even though the comfort zone temperature is below its set point temperature and regardless of the relative humidity.

Another object is to disregard an absence of a cooling demand and energize a cooling system to reduce humidity and improve ventilation.

Yet another object is to periodically activate a cooling system to reduce humidity without relying on a humidistat.

A further object is to operate a cooling system below the set point temperature without using a resistive heating element inside the thermostat.

A still further object is to limit the number of times a cooling system is successively operated below the set point temperature and limit the temperature range below the set point over which the cooling system can be operated.

Another object is to provide a microcomputer based control located remote from, but electrically connected to, a thermostat, with the control being able to activate a cooling system and being able to derive the thermostat set point temperature based on the zone temperature at which the cooling system was last energized or de-energized.

These and other objects of the invention are accomplished by a novel method of controlling a cooling apparatus The method includes relying on a timer to periodically re-energize a refrigeration compressor and a supply air fan for a predetermined on-period when the zone temperature is below its set point and the compressor has been de-energized for a predetermined off-period.

DESCRIPTION OF THE PREFERRED EMBODIMENT

Figure 1:
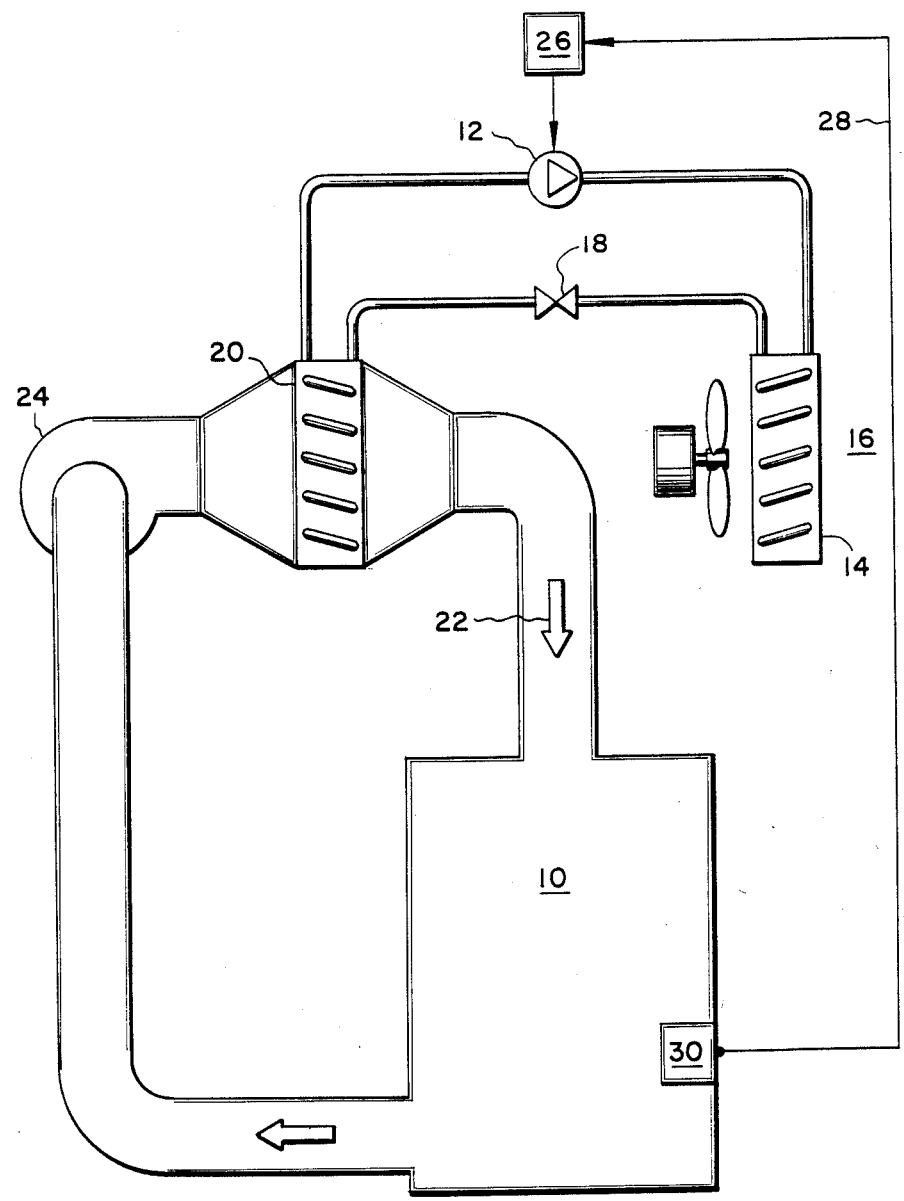
FIG. 1 shows a refrigeration system incorporating the subject invention.

Referring to FIG. 1, a cooling apparatus for cooling a comfort zone 10 typically includes a refrigeration compressor 12, a condenser 14 for expelling heat to outside air 16, an expansion device 18 for reducing the pressure and temperature of compressed refrigerant and an evaporator 20 for cooling supply air 22 which is discharged to comfort zone 10 by a blower 24.

Compressor 12 is energized and de-energized under the control of a microcomputer based control 26. In one embodiment of the invention, the microcomputer is a Mitsubishi 50743 microcomputer. Control 26 is responsive to a temperature input 28 provided by a thermostat 30 which senses the temperature of zone 10. Under normal operating conditions, control 26 energizes or de-energizes compressor 12, depending on whether the zone temperature is respectively above or below a set point temperature.

Control 26 relies on stored predetermined temperature limits and predetermined time periods to momentarily re-energize compressor 12 and blower 24 after extended off periods. In one embodiment of the invention, control 26 stores data corresponding to the information shown in Table I.

TABLE I

| Set Point Temperature | 70° F. |
|---|---|
| First Predetermined Temp. Limit | 69.5° F. |
| First Predetermined Off-Period | 2 Hours |
| First Predetermined On-Period | 25 Minutes |
| Second Predetermined Off-Period | 69° F. |
| Second Predetermined Off-Period | 4 Hours |
| Second Predetermined On-Period | 30 Minutes |
| Third Predetermined Temp. Limit | 68° F. |

Referring to Table I, when compressor 12 has been off for 2 hours and the zone temperature is between 69° F. and 69.5° F., control 26 energizes compressor 12 at a minimum speed for 25 minutes. Control 26 also energizes compressor 12 at the minimum speed for 30 minutes if the zone temperature is between 68° F. and 69° F. and compressor 12 hasn't run for the last 4 hours. In addition, compressor 12 is energized when the zone temperature rises above the set point of 70° F. Above the set point temperature, the speed of the compressor varies between the minimum and a maximum speed to meet the cooling demand. It should be appreciated that the figures in Table I are only exemplary and the actual values of any of the figures can be changed significantly to suit the specific needs of the user. For example, the first predetermined on-period and the second predetermined on-period could both be set to equal 20 minutes. And the first predetermined temperature limit could be set to equal the set point temperature. If a constant speed compressor is used, the predetermined on-periods can be reduced substantially to compensate for the system's inability to operate at a reduced speed.

Figure 2:
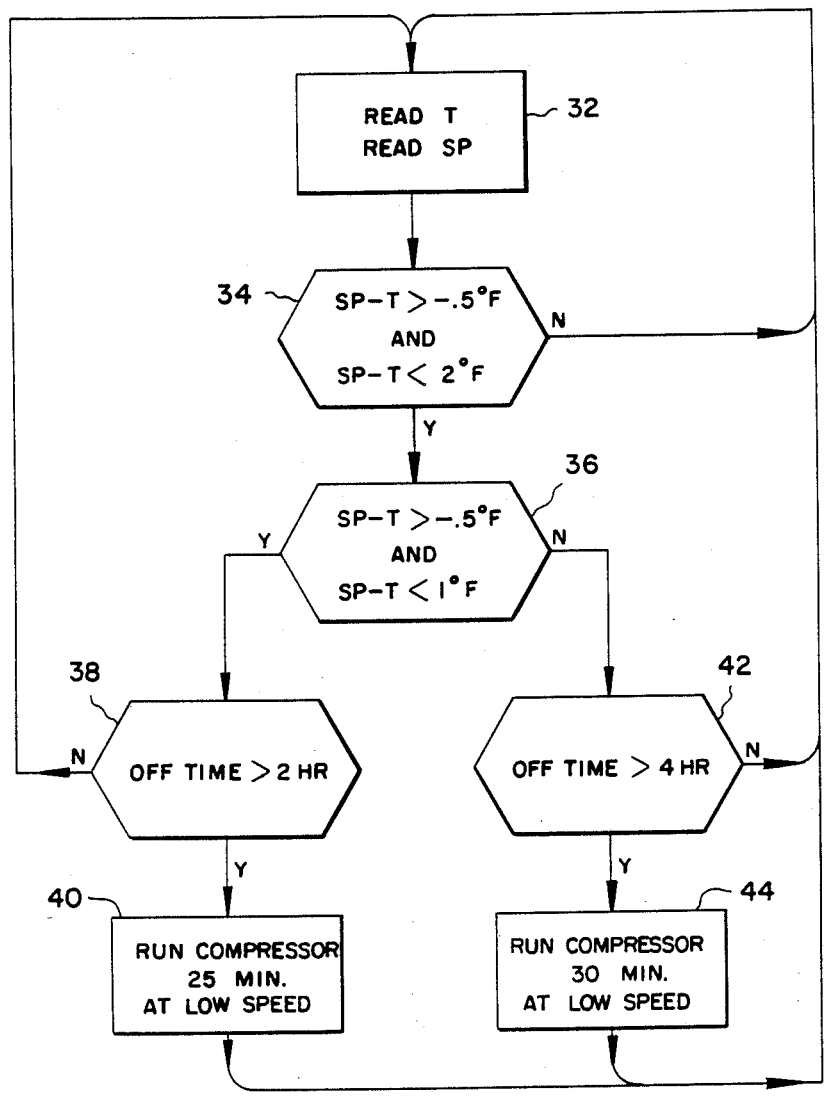
FIG. 2 shows an example of one algorithm that can be used to control a refrigeration system according to one embodiment of the invention.

The method of control, just described with reference to Table 1 is carried out by control 26 operating under the algorithm of FIG. 2. The control algorithm begins at block 32 where the zone temperature "T" and the set point temperature "SP" is read. At block 34, the zone temperature is compared to the set point temperature. If the temperature differential is beyond −0.5 to 2° F., compressor 12 is controlled in a conventional manner, i.e., compressor 12 is driven at a speed that increases with the cooling demand whenever the zone temperature is generally above or at least 0.5° F. over the set point temperature. If the differential SP-T (set point temperature minus zone temperature) is within −0.5 to 2° F. control proceeds to block 36. If the differential is within −0.05 to 1° and compressor 12 has been off for the last 2 hours as determined by block 38, block 40 instructs compressor 12 to run for 25 minutes. If compressor 12 ran within the last 2 hours then compressor 12 is left off. If the temperature differential is more than 1° F. and block 42 determines that compressor 12 hasn't run for the past 4 hours, block 44 affects the energizing of compressor 12 for 30 minutes.

In the preferred embodiment of the invention, the timing functions of the algorithm are performed by the microcomputer itself, thus serving as what is referred to hereinbelow, as a timer. As an alternative, however, an external timer could also be used and the function of the microcomputer could be carried out by discrete electronic components.

Thermostat 30 can be located remote from control 26. FIG. 1, example, shows thermostat 30 disposed in comfort zone 10 while control 26 is located outdoors, near compressor 12. With such an arrangement, changing the set point temperature at thermostat 30 is not readily communicated to control 26. Therefore, as an alternative to the algorithm of FIG. 2, which relies on the set point value, control 26 can employ the algorithm of FIG. 3.

Figure 3:
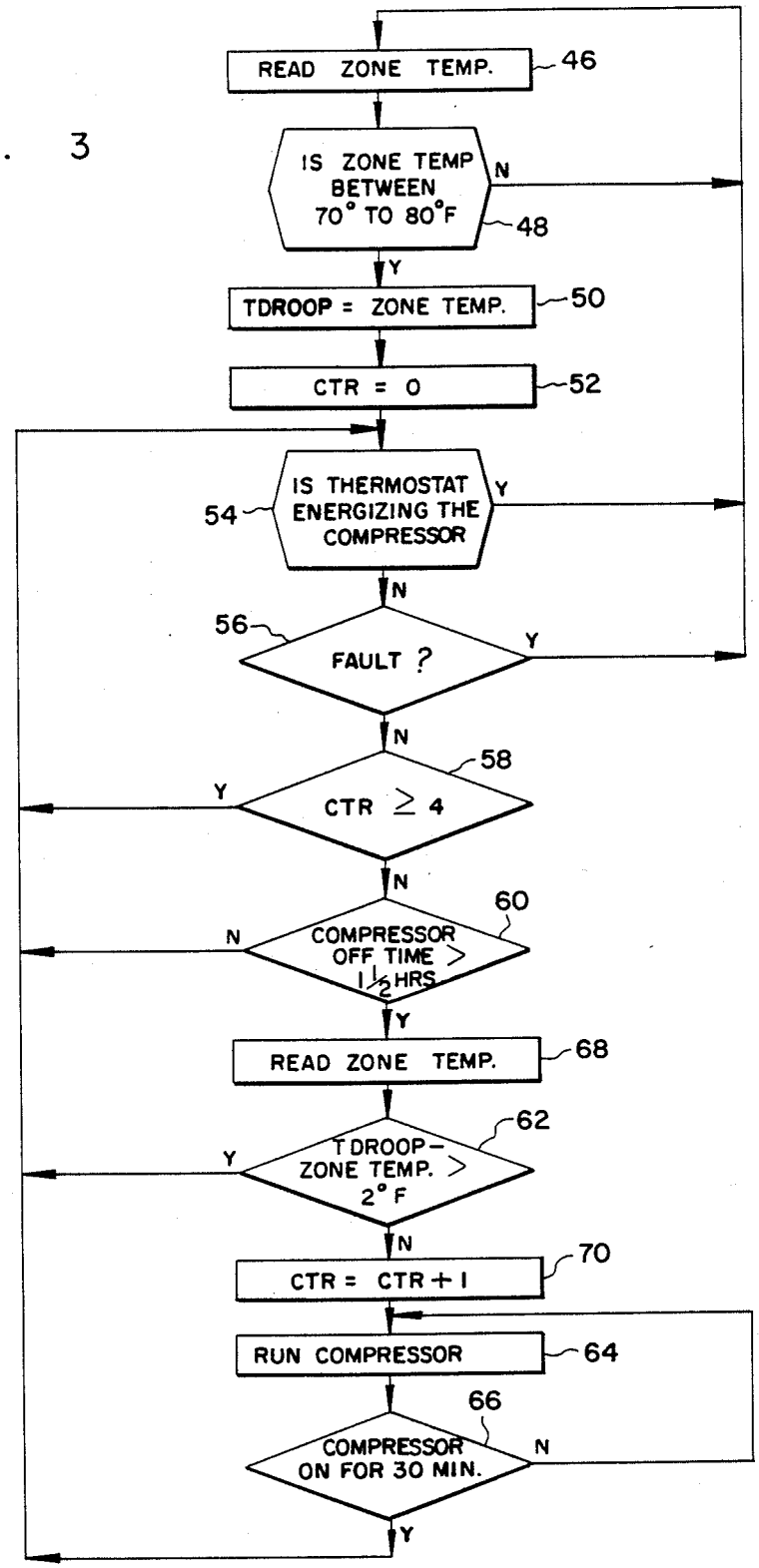
FIG. 3 shows an example of an algorithm that can be used to control a refrigeration system according to another embodiment of the invention.

The algorithm of FIG. 3 begins at block 46 where the zone temperature is read. If the temperature is between 70° and 80° F. as determined by block 48, the variable, "TDROOP", is assigned a digital value equal to the zone temperature in block 50, and a counter is reset in block 52. If thermostat 30 does not have compressor 12 energized (e.g., the zone temperature is below the set point) and no fault exists as determined by blocks 54 and 56 respectively, then control continues to block 58. Blocks 58, 60, and 62 define conditions that must be met before compressor 12 is momentarily run for 30 minutes, as indicated by blocks 64 and 66. Block 58, in conjunction with block 70, ascertains that block 64 has not energized compressor 12 more than 4 consecutive times. Block 60 makes sure the compressor has been off for at least 1-½ hours. Block 62 compares the current zone temperature to TDROOP, with TDROOP being the zone temperature that existed when compressor 12 was last de-energized by thermostat 30. In other words, TDROOP is approximately equal to the set point temperature. As an alternative, TDROOP could be the zone temperature that existed just as compressor 12 last changed from a de-energized state to an energized state in response to the zone temperature exceeding the set point temperature. If the current zone temperature, as read by block 68, is more than 2° F. below TDROOP, then block 62 prevents block 64 from energizing compressor 12.

Control 26 basically performs the same function regardless of which algorithm it employs. It should be appreciated that the specific values used in either algorithm are only exemplary and many of the values such as those listed in blocks 34–44 48 58–62, and 66 can be changed to suit the particular needs of different systems. Although the invention is described with respect to a preferred embodiment modifications thereto will be apparent to those skilled in the art. Therefore, the scope of the invention is to be determined by reference to the claims which follow.

We claim:

1. A method of controlling a cooling apparatus comprising the steps of:
    sensing a zone temperature of a comfort zone;
    energizing a refrigeration compressor to affect cooling of said zone when said zone temperature is generally above a set point temperature;
    de-energizing said compressor when said zone temperature drops generally below a first predetermined temperature limit; and
    relying on a timer in re-energizing said compressor to affect further cooling of said zone for a first predetermined on-period when said zone temperature remains below said set point temperature and above a second predetermined temperature limit for a first predetermined off-period.

2. The method as recited in claim 1, wherein said compressor is of variable speed and in the step of energizing, said compressor is driven at speeds that are most often higher than those when said compressor is driven during the step of re-energizing.

3. The method as recited in claim 1, further comprising the step of prohibiting the re-energizing to affect cooling of said zone when said zone temperature is below said second predetermined temperature limit.

4. The method as recited in claim 1, further comprising the step of relying on said timer for re-energizing said compressor to affect further cooling of said zone for a second predetermined on-period when said zone temperature remains below said second predetermined temperature limit and above a third predetermined temperature limit for a second predetermined off-period, with said second predetermined off-period being longer than said first predetermined off-period.

5. The method as recited in claim 4, further comprising the step of prohibiting the re-energizing to affect cooling of said zone when said zone temperature is below said third predetermined temperature limit.

6. A method of controlling a cooling apparatus comprising the steps of:
    sensing a zone temperature of a comfort zone;
    energizing a refrigeration compressor to affect cooling of said zone when said zone temperature is generally above a set point temperature;
    de-energizing said compressor when said zone temperature drops below a first predetermined temperature limit;
    storing a digital value representing said zone temperature that existed just as said compressor changed between an energized state and a de-energized state; and re-energizing said compressor for a first predetermined on-period when,
  i. said zone temperature remains below said digital value and above a second predetermined temperature limit for a first predetermined off-period, and
  ii. a temperature difference between said zone temperature and said digital value remains within a predetermined number of degrees.

7. The method as recited in claim 6, wherein said digital value represents said zone temperature that existed just as said compressor was last de-energized due to said zone temperature dropping below said first predetermined temperature limit.

8. The method as recited in claim 6, wherein said digital value represents said zone temperature that existed just as said compressor was last energized due to said zone temperature rising above said set point temperature.

9. The method as recited in claim 6, wherein said compressor is of variable speed and in the step of energizing, said compressor is driven at speeds that are most often higher than those when said compressor is driven during the step of re-energizing.

10. The method as recited in claim 6, further comprising the step of prohibiting the re-energizing to affect cooling of said zone when said zone temperature is below said second predetermined temperature limit.

11. The method as recited in claim 6, further comprising the step of relying on said timer for re-energizing said compressor to affect further cooling of said zone for a second predetermined on-period when said zone temperature remains below said second predetermined temperature limit and above a third predetermined temperature limit for a second predetermined off-period, with said second predetermined off-period being longer than said first predetermined off-period.

12. The method as recited in claim 11, further comprising the step of prohibiting the re-energizing to affect cooling of said zone when said zone temperature is below said third predetermined temperature limit.

13. A method of controlling a cooling apparatus having a variable speed compressor and a supply air fan blowing across an evaporator, said method comprising the steps of:
sensing a zone temperature of a comfort zone;
energizing said refrigeration compressor and said supply air fan to affect cooling of said zone when said zone temperature is generally above a set point temperature;
de-energizing said compressor and said fan when said zone temperature drops generally below a first predetermined temperature limit;
relying on a timer in re-energizing said compressor and said fan to affect further cooling of said zone for a first predetermined on-period when said zone temperature remains generally below said set point temperature and above a second predetermined temperature limit for a first predetermined off-period;
relying on said timer for re-energizing said compressor and said fan to effect further cooling of said zone for a second predetermined on-period when said zone temperature remains below said second predetermined temperature limit and above a third predetermined temperature limit for a second predetermined off-period, with said second predetermined off-period being longer than said first predetermined off-period; and
prohibiting the re-.energizing of said compressor and said fan to affect cooling of said zone when said zone temperature is below said third predetermined temperature limit.

14. The method as recited in claim 13, wherein the step of energizing, said compressor is driven at speeds that are generally higher than those when said compressor is driven during the steps of re-energizing.

* * * * *

UNITED STATES PATENT AND TRADEMARK OFFICE
CERTIFICATE OF CORRECTION

PATENT NO. : 4,850,198
DATED : July 25, 1989
INVENTOR(S) : Robert W. Helt and John D. Neal It is certified that error appears in the above-identified patent and that said Letters Patent is hereby corrected as shown below:

In the Specification:

Column 1, line 44, "on periods" should be --on-periods--.

Column 2, line 26, after "refrigerant" insert --,--.

Column 2, line 50, "Second Predetermined Off-Period 69°F" should be --Second Predetermined Temp. Limit 69°F--.

Column 3, line 22, "2°F." should be --2°F,--.

Column 3, line 39, after "FIG. 1," insert --for--.

Column 4, line 10, after "34-44" insert --,--.

Column 4, line 10, after "48" insert --,--.

Column 4, line 14, after "embodiment" insert --,--.

Signed and Sealed this

Eighth Day of May, 1990

*Attest:*

HARRY F. MANBECK, JR.

*Attesting Officer*     *Commissioner of Patents and Trademarks*